United States Patent
Zhu et al.

(10) Patent No.: US 11,487,831 B2
(45) Date of Patent: *Nov. 1, 2022

(54) COMPATIBILITY SCORING OF USERS

(71) Applicant: META PLATFORMS, INC., Menlo Park, CA (US)

(72) Inventors: Xiao Ming Zhu, San Jose, CA (US); Christopher Lunt, Mountain View, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 16/514,596

(22) Filed: Jul. 17, 2019

(65) Prior Publication Data

US 2019/0340208 A1 Nov. 7, 2019

Related U.S. Application Data

(60) Continuation of application No. 14/281,530, filed on May 19, 2014, now Pat. No. 10,402,459, which is a (Continued)

(51) Int. Cl.
*G06Q 10/10* (2012.01)
*G06F 16/9535* (2019.01)
(Continued)

(52) U.S. Cl.
CPC .......... *G06F 16/9535* (2019.01); *G06F 16/24* (2019.01); *G06Q 50/01* (2013.01);
(Continued)

(58) Field of Classification Search
CPC .. G06F 16/9535; G06F 16/24; G06F 16/2457; G06F 16/435; G06Q 99/00;
(Continued)

(56) References Cited

U.S. PATENT DOCUMENTS 5,754,939 A * 5/1998 Herz .................. H04N 21/4755
348/E7.071
5,950,200 A 9/1999 Sudai et al.
(Continued)

FOREIGN PATENT DOCUMENTS

EP 1065607 A2 1/2001
JP 2003093745 A 4/2003
(Continued)

OTHER PUBLICATIONS

Decision of Rejection dated Mar. 21, 2012 for Chinese Application No. 200680020711.9, filed Apr. 27, 2006, 12 Pages.
(Continued)

*Primary Examiner* — Gabrielle A McCormick
(74) *Attorney, Agent, or Firm* — Jordan IP Law, LLC

(57) ABSTRACT

In one embodiment, one or more computing devices receives, from a first user, a request to search for compatible users, wherein the first user is associated with a set of first expressed interests, accesses one or more sets of second expressed interests of one or more second users, respectively, normalizes the set of first expressed interests and the sets of second expressed interests to obtain a set of first normalized interests and one or more sets of second normalized interests, respectively, calculates, for each set of second expressed interests, an interest compatibility score based at least in part on a probability that a user will express one or more pairs of a first normalized interest and a second normalized interest, and sends, to the first user, information associated with one or more of the second users based on the calculated interest compatibility scores.

18 Claims, 9 Drawing Sheets

| Search Results | | Sort by: d/s score proximity | | |
|---|---|---|---|---|
| Rank | Photo | Member | Score | 800 |
| 1 | Photo | User D<br>Mini-profile | 14.11 | |
| 2 | Photo | User B<br>Mini-profile | 13.05 | |
| 3 | Photo | User S<br>Mini-profile | 11.19 | |
| 4 | Photo | User G<br>Mini-profile | 10.01 | |

Related U.S. Application Data continuation of application No. 13/337,803, filed on Dec. 27, 2011, now Pat. No. 8,775,324, which is a continuation of application No. 12/242,562, filed on Sep. 30, 2008, now Pat. No. 8,150,778, which is a division of application No. 11/117,793, filed on Apr. 28, 2005, now Pat. No. 7,451,161.

(51) Int. Cl.
*G06F 16/24* (2019.01)
*G06Q 99/00* (2006.01)
*G06Q 50/00* (2012.01)

(52) U.S. Cl.
CPC ....... *G06Q 99/00* (2013.01); *Y10S 707/99942* (2013.01); *Y10S 707/99945* (2013.01); *Y10S 707/99948* (2013.01)

(58) Field of Classification Search
CPC .... G06Q 50/01; G06Q 30/0204; G06Q 30/02; Y10S 707/99945; Y10S 707/99942; Y10S 707/99948
USPC ........................................................ 705/319
See application file for complete search history.

(56) References Cited

U.S. PATENT DOCUMENTS

| | | | |
|---|---|---|---|
| 5,963,951 A | 10/1999 | Collins | |
| 5,978,768 A | 11/1999 | McGovern et al. | |
| 6,052,122 A | 4/2000 | Sutcliffe et al. | |
| 6,061,681 A | 5/2000 | Collins | |
| 6,073,105 A | 6/2000 | Sutcliffe et al. | |
| 6,073,138 A | 6/2000 | de l'Etraz et al. | |
| 6,112,186 A | 8/2000 | Bergh et al. | |
| 6,150,937 A * | 11/2000 | Rackman | G08B 1/08 340/567 |
| 6,175,831 B1 | 1/2001 | Weinreich et al. | |
| 6,249,282 B1 | 6/2001 | Sutcliffe et al. | |
| 6,269,369 B1 | 7/2001 | Robertson | |
| 6,324,541 B1 | 11/2001 | de l'Etraz et al. | |
| 6,366,962 B1 | 4/2002 | Teibel | |
| 6,370,510 B1 | 4/2002 | McGovern et al. | |
| 6,408,309 B1 | 6/2002 | Agarwal | |
| 6,542,748 B2 | 4/2003 | Hendrey et al. | |
| 6,636,427 B2 | 10/2003 | Dorrie | |
| 6,735,568 B1 | 5/2004 | Buckwalter et al. | |
| 6,839,680 B1 | 1/2005 | Liu et al. | |
| 6,907,465 B1 * | 6/2005 | Tsai | G06Q 30/0601 709/206 |
| 7,010,599 B2 | 3/2006 | Shrinivasan et al. | |
| 7,454,078 B2 * | 11/2008 | Ramamurthy | H04N 5/235 382/254 |
| 2002/0026478 A1 | 2/2002 | Rodgers et al. | |
| 2002/0086676 A1 | 7/2002 | Hendrey et al. | |
| 2002/0160339 A1 * | 10/2002 | King | G09B 19/00 434/106 |
| 2002/0178163 A1 | 11/2002 | Mayer | |
| 2003/0078976 A1 * | 4/2003 | Gordon | G06Q 30/02 709/205 |
| 2003/0093322 A1 * | 5/2003 | Sciuk | G06Q 30/0202 705/321 |
| 2003/0115194 A1 | 6/2003 | Pitts et al. | |
| 2003/0154194 A1 | 8/2003 | Jonas | |
| 2003/0167324 A1 | 9/2003 | Farnham et al. | |
| 2004/0034601 A1 | 2/2004 | Kreuzer | |
| 2004/0088325 A1 | 5/2004 | Elder et al. | |
| 2004/0144301 A1 | 7/2004 | Neudeck et al. | |
| 2004/0148275 A1 | 7/2004 | Achlioptas | |
| 2004/0194141 A1 * | 9/2004 | Sanders | H04N 21/47 725/53 |
| 2004/0210639 A1 | 10/2004 | Ben-Yoseph et al. | |
| 2004/0215648 A1 | 10/2004 | Marshall et al. | |
| 2004/0215793 A1 * | 10/2004 | Ryan | G06Q 10/1053 709/229 |
| 2004/0249811 A1 | 12/2004 | Shostack et al. | |
| 2004/0260781 A1 * | 12/2004 | Shostack | G06Q 30/02 709/207 |
| 2005/0038533 A1 * | 2/2005 | Farrell | G06F 16/9024 707/E17.011 |
| 2005/0055416 A1 | 3/2005 | Heikes et al. | |
| 2005/0086211 A1 * | 4/2005 | Mayer | H04L 51/04 |
| 2005/0097170 A1 | 5/2005 | Zhu et al. | |
| 2005/0097319 A1 | 5/2005 | Zhu et al. | |
| 2005/0159998 A1 * | 7/2005 | Buyukkokten | G06Q 50/01 705/319 |
| 2005/0171955 A1 | 8/2005 | Hull et al. | |
| 2005/0201290 A1 * | 9/2005 | Vasudev | H04W 4/20 370/238 |
| 2005/0256866 A1 * | 11/2005 | Lu | G06F 16/24573 707/999.005 |
| 2005/0289168 A1 * | 12/2005 | Green | G06F 16/285 |
| 2006/0059159 A1 * | 3/2006 | Truong | G06Q 10/10 |
| 2006/0247940 A1 * | 11/2006 | Zhu | G06F 16/9535 705/1.1 |
| 2006/0247973 A1 * | 11/2006 | Mueller | G06Q 20/20 705/26.1 |
| 2007/0198319 A1 * | 8/2007 | Sciuk | G06F 16/9535 705/7.26 |
| 2009/0024548 A1 | 1/2009 | Zhu et al. | |
| 2010/0185580 A1 | 7/2010 | Zhu et al. | |
| 2019/0340208 A1 * | 11/2019 | Zhu | G06F 16/9535 |

FOREIGN PATENT DOCUMENTS

| | | |
|---|---|---|
| WO | 0120481 A2 | 3/2001 |
| WO | 03030051 A1 | 4/2003 |

OTHER PUBLICATIONS

Examination Report dated Jul. 5, 2012 for Indian Application No. 5461/CHENP/2007, filed Nov. 28, 2007, 1 Page.
Extended European Search Report for European Application No. 06758645.3, dated Mar. 3, 2010, 7 Pages.
Final Office Action dated Apr. 4, 2012 for U.S. Appl. No. 12/748,145, filed Mar. 26, 2010, 11 Pages.
Final Office Action dated May 30, 2008 for U.S. Appl. No. 11/117,793, filed Apr. 28, 2005, 12 pages.
First Office Action Issued by State Intellectual Property Office dated Jan. 19, 2018 for Chinese Application No. 201510217725.0, filed Apr. 27, 2006, 8 Pages.
International Preliminary Report on Patentability for International Application No. PCT/US2006/015908, dated Mar. 17, 2009, 7 Pages.
International Search Report and Written Opinion for International Application No. PCT/US2006/015908, dated Jan. 17, 2008, 9 Pages.
Non-Final Office Action dated Apr. 11, 2013 for U.S. Appl. No. 12/748,145, filed Mar. 26, 2010, 14 Pages.
Non-Final Office Action dated Jul. 13, 2011 for U.S. Appl. No. 12/242,562, filed Sep. 30, 2008, 6 pages.
Non-Final Office Action dated Feb. 14, 2013 for U.S. Appl. No. 13/432,641, filed Mar. 28, 2012, 8 pages.
Non-Final Office Action dated Nov. 15, 2007 for U.S. Appl. No. 11/117,793, filed Apr. 28, 2005, 11 pages.
Non-Final Office Action dated Aug. 18, 2011 for U.S. Appl. No. 12/748,145, filed Mar. 26, 2010, 11 Pages.
Notice of Final Rejection dated Jun. 1, 2010 for Korean Application No. 2007-7027777, filed Apr. 27, 2006, 6 Pages.
Notice of Rejection dated Nov. 2, 2010 for Japanese Application No. 2008-509097, filed Apr. 27, 2006, 6 Pages.
Office Action dated Sep. 2, 2014 for Chinese Application No. 200680020711.9, filed Apr. 27, 2006, 8 Pages.
Office Action dated Aug. 3, 2018 for Chinese Application No. 201510217725.0, filed Apr. 27, 2006, 22 Pages.
Office Action dated Dec. 3, 2018 for Chinese Application No. 201510217725.0, filed Apr. 27, 2006, 21 Pages.

(56) References Cited

OTHER PUBLICATIONS

Office Action dated Jun. 23, 2010 for Chinese Application No. 200680020711.9, filed Apr. 27, 2006, 8 Pages.
Office Action dated Nov. 27, 2012 for European Application No. 06758645.3, filed Apr. 27, 2006, 7 Pages.
Office Action dated Jul. 29, 2011 for Indian Application No. 5461/CHENP/2007, filed Nov. 28, 2007, 9 Pages.
Office Action dated May 30, 2011 for Chinese Application No. 200680020711.9, filed Apr. 27, 2006, 8 Pages.
O'Mahony M.P., et al., "An Evaluation of Neighbourhood Formation on the Performance of Collaborative Filtering," Department of Computer Science, University College Dublin, Artificial Intelligence Review, 2004, vol. 21, pp. 215-228.
Rejection Decision dated Feb. 12, 2019 for Chinese Application No. 201510217725.0, filed Apr. 27, 2006, 19 Pages.
Summons to Attend Oral Proceedings mailed Jul. 20, 2012 for European Application No. 06758645.3, filed Apr. 27, 2006, 5 Pages.

* cited by examiner

FIG. 7

Keyword:
Hometown ▼

Ages: 18 to 30

People who are:
Men & Women ▼

Country:
UNITED STATES ▼

Proximity:
Within 50 miles of ▼

Zip or City, State:

Show Profiles Within:
Three Degrees ▼

Show:
☐ Profiles with Photos Only
Photos & Info ▼

Search  — 710

He/She is interested in:
☐ All
☐ Dating Men
☐ Dating Women
☐ Relationship Men
☐ Relationship Women
☐ Friends
☐ Activity Partners
☐ Just Looking Around Relationship Status:
☐ Any
☐ Single
☐ In a Relationship
☐ Domestic Partnership
☐ Married
☐ Unknown Status

| Search Results | | Sort by: d/s  score  proximity | |
|---|---|---|---|
| Rank | Photo | Member | Score |
| 1 | Photo | User D<br>*Mini-profile* | 14.11 |
| 2 | Photo | User B<br>*Mini-profile* | 13.05 |
| 3 | Photo | User S<br>*Mini-profile* | 11.19 |
| 4 | Photo | User G<br>*Mini-profile* | 10.01 |

800

COMPATIBILITY SCORING OF USERS

PRIORITY

This Application is a continuation of U.S. patent application Ser. No. 14/281,530, filed 19 May 2014, which is a continuation of U.S. patent application Ser. No. 13/337,803, filed 27 Dec. 2011, now U.S. Pat. No. 8,775,324, which is a continuation of U.S. patent application Ser. No. 12/242,562, filed 30 Sep. 2008, now U.S. Pat. No. 8,150,778, which is a divisional of U.S. patent application Ser. No. 11/117,793, filed 28 Apr. 2005, now U.S. Pat. No. 7,451,161, each of which is incorporated herein by reference.

TECHNICAL FIELD

The present invention generally relates to processing of social network data, and more particularly, to a method for scoring compatibility between members of an online social network.

BACKGROUND

Several online dating and friend-making sites currently operate on the Internet. These services are generally similar in function. They allow users to post profiles and photos, as well as search through the profiles and photos of other users. Communication between users is provided anonymously, since users are identified by pseudonyms.

Initially, these sites implemented rudimentary techniques to match users. These techniques amounted to no more than user profile searches based on criteria such as age, gender, location, and physical characteristics. More recently, these sites have implemented more sophisticated processes in an effort to find better matches for their users. These processes attempt to assess an individual's personality based on specially designed tests or questionnaires and find users who have compatible personalities.

SUMMARY OF PARTICULAR EMBODIMENTS

The present invention bases compatibility of two individuals who are members of a social network on the compatibility of interests expressed by these individuals, and provides for methods for quantifying compatibility of interests, scoring compatibility of the two individuals in accordance with compatibility of interests expressed by these individuals, and presenting compatibility results that include the compatibility scores.

The method of quantifying compatibility of interests includes the steps of calculating an estimated probability associated with each interest (referred to herein as "interest probability") and each pair of interests (referred to herein as "joint probability"), and assigning an interest compatibility score between each pair of interests based on the estimated probabilities. The estimated interest probability for a particular interest represents the probability that a member of the social network will express that interest as one of his or her interests. The estimated joint probability for a particular pair of interests represents the probability that a member of the social network will express both interests in the pair as his or her interests.

In accordance with one embodiment of the present invention, the interest compatibility score between each pair of interests is computed as a function of the estimated joint probability for the pair, and the estimated interest probabilities for the first and second interests of the pair.

The method of scoring compatibility in accordance with compatibility of interests includes the steps of preparing interest compatibility scores based on expressed interests of the members of the social network, and computing a compatibility score between a first member of the social network and a second member of the social network based on expressed interests of the first member, expressed interests of the second member, and the interest compatibility scores between the expressed interests of the first member and the expressed interests of the second member. The interest compatibility score for any two expressed interests represents the degree of compatibility between the two expressed interests.

The method of presenting compatibility results that include the compatibility scores, e.g., to an individual in the social network, includes the steps of preparing interest compatibility scores based on expressed interests of the individuals in the social network, selecting a set of individuals who are within a predetermined degree of separation from the first individual, and computing a compatibility score between the first individual and each of the individuals in the set. If the predetermined degree of separation is set as one, this means that only the compatibility scores of the first individual's direct friends will be presented. The compatibility results that include the compatibility scores are presented as a web page and before the web page is transmitted to be displayed, the compatibility results are sorted in the order of the compatibility scores. By providing compatibility scores and linking it to interest profiles, the invention encourages people to enter interests so the site can find other people who share the same or compatible interests.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 is a sample GUI used to specify member search criteria;

FIG. 8 is a sample member search results page containing compatibility scores.

DESCRIPTION OF EXAMPLE EMBODIMENTS

Figure 1:
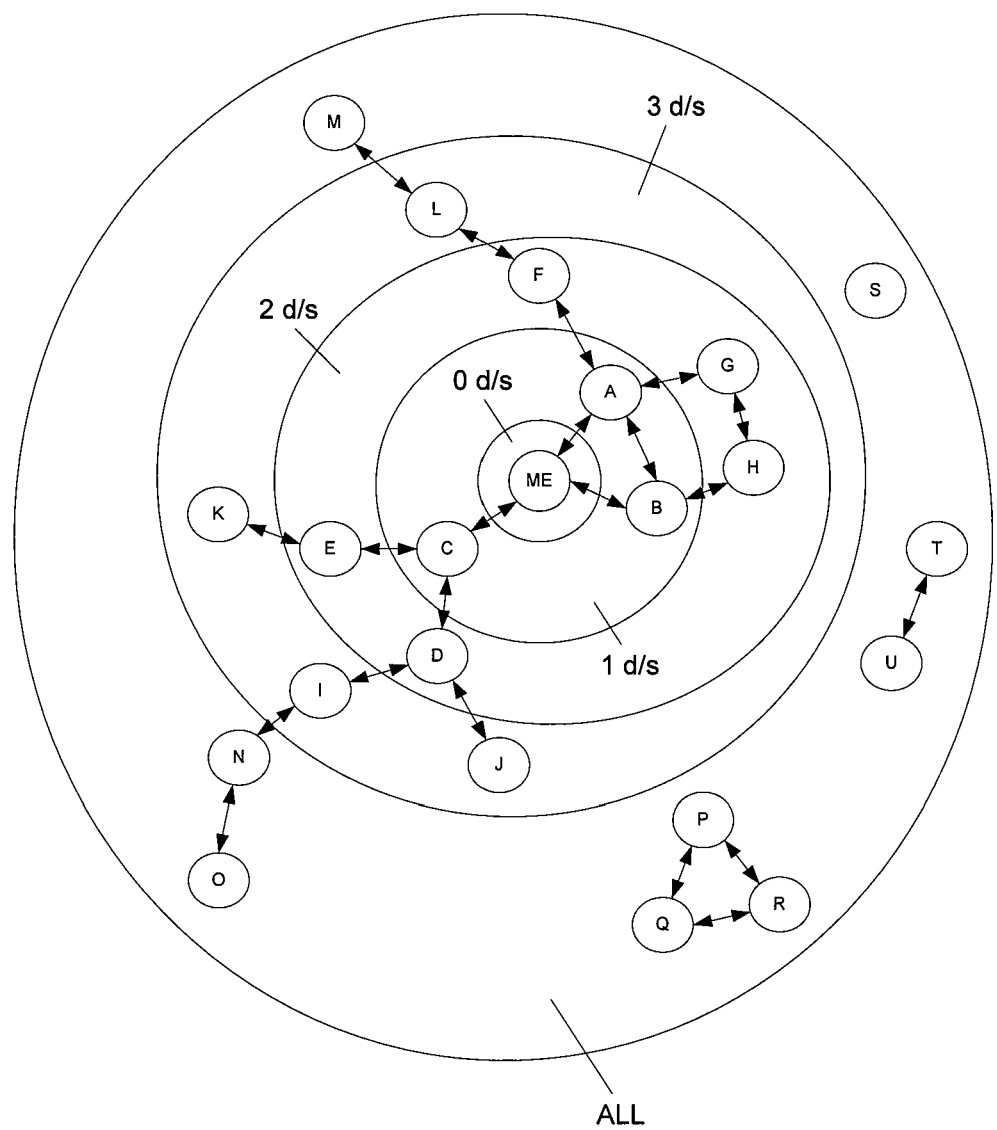
FIG. 1 is a diagram that graphically represents the relationships between members in a social network.

FIG. 1 is a graph representation of a social network centered on a given individual (ME). Other members of this social network include A-U whose position, relative to ME's, is referred to by the degree of separation between ME and each other member. Friends of ME, which includes A, B, and C, are separated from ME by one degree of separation (1 d/s). A friend of a friend of ME is separated from ME by 2 d/s. As shown, D, E, F, G, and H are each separated from ME by 2 d/s. A friend of a friend of a friend of ME is separated from ME by 3 d/s. FIG. 1 depicts all nodes separated from ME by more than 3 degrees of separation as belonging to the category ALL.

Degrees of separation in a social network are defined relative to an individual. For example, in ME's social network, H and ME are separated by 2 d/s, whereas in G's social network, H and G are separated by only 1 d/s. Accordingly, each individual will have their own set of first, second and third degree relationships.

As those skilled in the art understand, an individual's social network may be extended to include nodes to an Nth degree of separation. As the number of degrees increases beyond three, however, the number of nodes typically grows at an explosive rate and quickly begins to mirror the ALL set.

Figure 2:
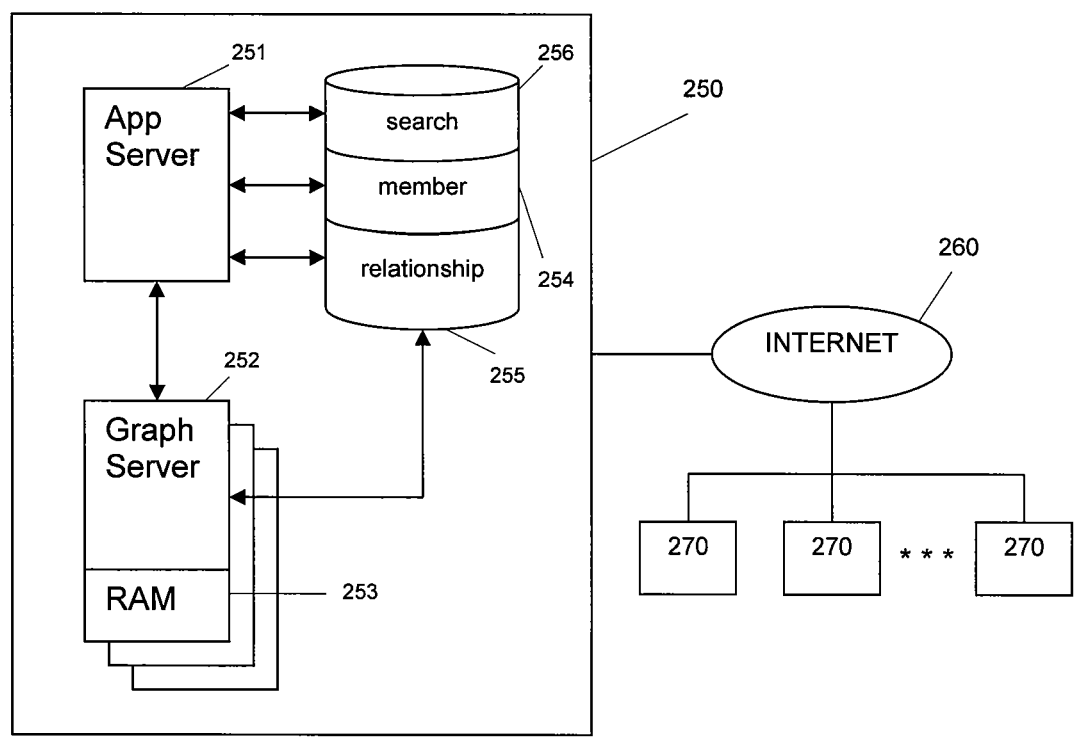
FIG. 2 is a block diagram illustrating components of a system for managing an online social network.

FIG. 2 is a block diagram illustrating a system for creating and managing an online social network. As shown, FIG. 2 illustrates a system 250 that includes an application server 251 and one or more graph servers 252. The system 250 is connected to a network 260, e.g., the Internet, and accessible over the network by a plurality of computers, collectively designated as 270. The application server 250 manages a member database 254, a relationship database 255, and a search database 256. The member database 254 contains profile information for each of the members in the online social network managed by the system 250. The profile information may include, among other things: a unique member identifier, name, age, gender, location, hometown, references to image files, listing of interests, attributes, and the like. The relationship database 255 stores information defining to the first degree relationships between members. In addition, the contents of the member database 254 are indexed and optimized for search, and stored in the search database 256. The member database 254, the relationship database 255, and the search database 256 are updated to reflect inputs of new member information and edits of existing member information that are made through the computers 270.

The application server 250 also manages the information exchange requests that it receives from the remote computers 270. The graph servers 252 receive a query from the application server 251, process the query and return the query results to the application server 252. The graph servers 252 manage a representation of the social network for all the members in the member database. The graph servers 252 have a dedicated memory device 253, such as a random access memory (RAM), in which an adjacency list that indicates all first degree relationships in the social network is stored. The graph servers 252 respond to requests from application server 251 to identify relationships and the degree of separation between members of the online social network.

Figure 3:
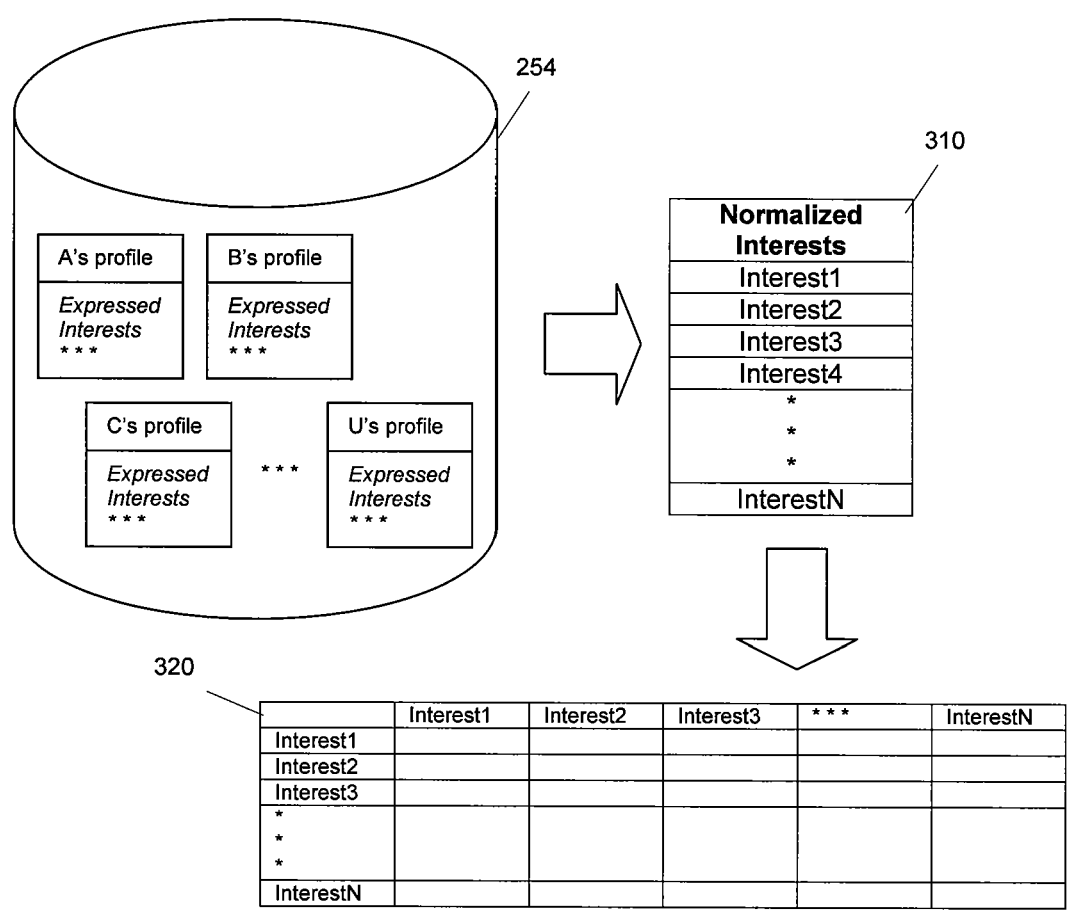
FIG. 3 schematically illustrates the process for computing interest compatibility data from a member database containing interest data.

FIG. 3 illustrates the member database 254 in additional detail and shows that the interest data stored therein is first converted into a set 310 of normalized interests and then to a matrix 320 of interest compatibility scores. The conversion into normalized interests and then to interest compatibility scores is performed by a processing unit of the application server 251.

The interest normalization process is in essence an interest classification process. It is performed so that the same interest expressed in different ways will be classified under that same interest. For example, an interest expressed as reading may be classified under the same normalized interest as an interest expressed as books. In the set 310 of normalized interests shown in FIG. 3, the normalized interests are shown as a list. In an alternative embodiment, the normalized interests may be arranged as a hierarchical tree. Further, the present invention may be applied to systems where members input interests by selecting one or more interests that have been pre-defined by the system operator. In such a case, the normalization step is not performed and the set of pre-defined interests is used as the set 310 of normalized interests.

The matrix 320 of interest compatibility scores provides numerical scores that represent how compatible each pair of normalized interests, Interest1, Interest2, . . . , InterestN, is. Each off-diagonal cell in the matrix 320 has a numerical score entry that indicates the compatibility of the two interests associated with that cell's row and column. Each diagonal cell in the matrix 320 has a numerical score entry that is a measure of the rarity of the interests associated with that cell's row and column. A rare interest has a high score. A commonly occurring interest has a low score. In the embodiment of the present invention illustrated herein, the interest compatibility scores are compiled automatically based on the expressed interests of the members that have been normalized. The interest compatibility scores can also be manually created or they can be created using a combination of automatic and manual processes. Further, any of the interest compatibility scores that are compiled automatically may be manually adjusted.

Figure 4:
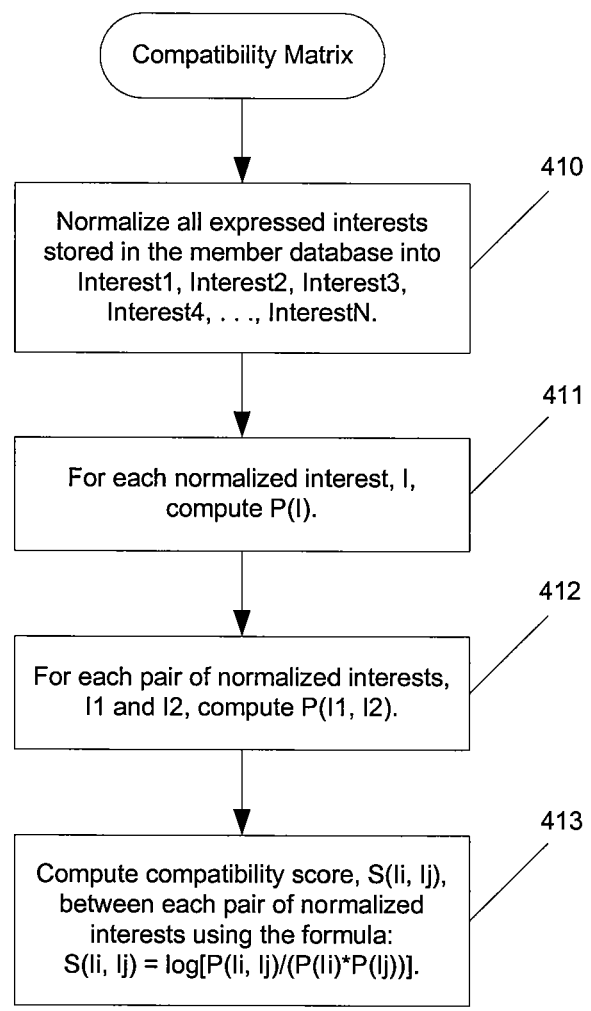
FIG. 4 is a flow diagram illustrating the process steps for computing interest compatibility data from a member database containing interest data.

FIG. 4 is a flow diagram that illustrates the process steps involved in generating the matrix 320. In Step 410, all expressed interests stored in the member database 254 are normalized into the set 310 of normalized interests, Interest, Interest, InterestN. A standard data mining methodology known as clustering can be used in Step 410. For each normalized interest, I, the probability, P(I), is calculated (Step 411). P(I) represents the probability that a member will express an interest that corresponds to the normalized interest, I, and is calculated using the expressed interests stored in the member database 254 according to the formula: P(I)=(number of times an interest corresponding to the normalized interest, I, is expressed in the member database 254)/(total number of expressed interests in the member database 254). For each pair of normalized interests, I1 and I2, the probability, P(I1, I2), is calculated (Step 412). P(I1, I2) represents the probability that a member will express interests that correspond to the normalized interests, I1 and I2, and is calculated using the expressed interests stored in the member database 254 according to the formula: P(I1, I2)=(number of members who expressed interests corresponding to both of the normalized interests, I1 and I2, in the member database 254)/(total number of expressed interests in the member database 254). In cases where I1=I2, P(I1, I2)

is set to P(I1) or P(I2). In Step 413, an interest compatibility score, S(Ii, Ij), is calculated between each pair of normalized interests using the formula: $S(I_i, I_j) = \log[P(I_i, I_j)/(P(I_i)*P(I_j))]$. Because of the division by $[P(I_i)*P(I_j)]$, using this formula, the commonality of rare interests are rated higher than commonality in more popular interests.

Figure 5:
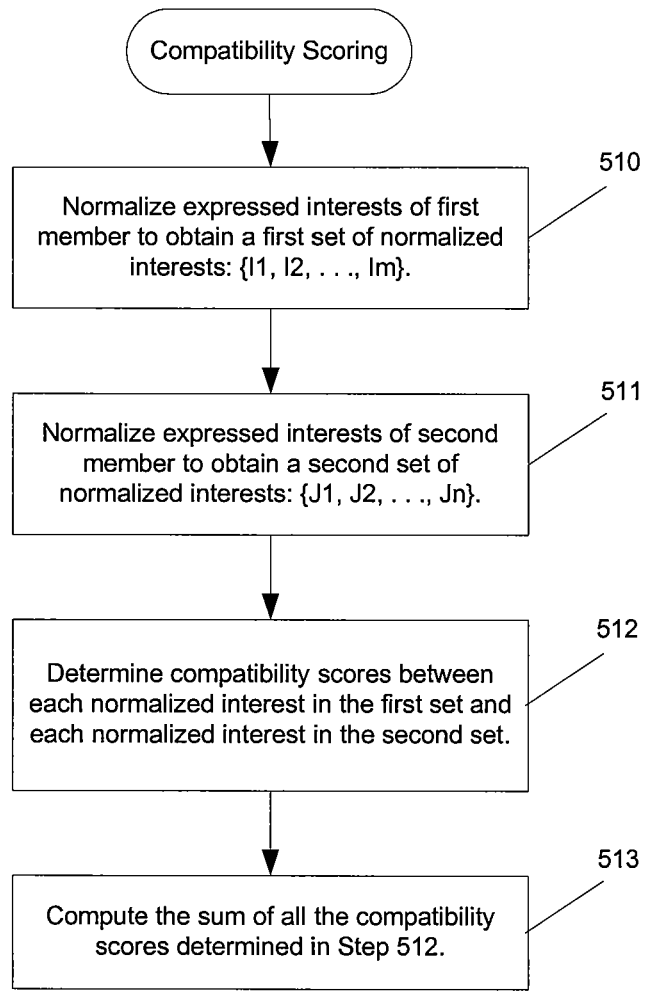
FIG. 5 is a flow diagram illustrating the process steps for computing a compatibility score between two members of a social network according to an embodiment of the present invention.

FIG. 5 is a flow diagram that illustrates the process steps executed by the processor of the application server 251 in computing a compatibility score between two members, e.g., a first member and a second member. In Step 510, the expressed interests of the first member are normalized into a first set {I1, I2, . . . , Im} of normalized interests, where m represents the number of normalized interests in the first set. In Step 511, the expressed interests of the second member are normalized into a second set {J1, J2, . . . , Jn} of normalized interests, where n represents the number of normalized interests in the second set. In Step 512, the interest compatibility scores for all pairs of normalized interests in the first and second sets are determined from the matrix 320. For example, if the first set is {Interest_1, Interest_2} and the second set is {Interest_2, Interest_3}, the following compatibility scores are retrieved from the matrix 320:

Compatibility(Interest_1, Interest_2);
Compatibility(Interest_1, Interest_3);
Compatibility(Interest_2, Interest_2); and
Compatibility(Interest_2, Interest_3).

In Step 513, the compatibility scores determined in Step 512 are summed, and the sum represents the compatibility score between the first member and the second member.

Figure 6:
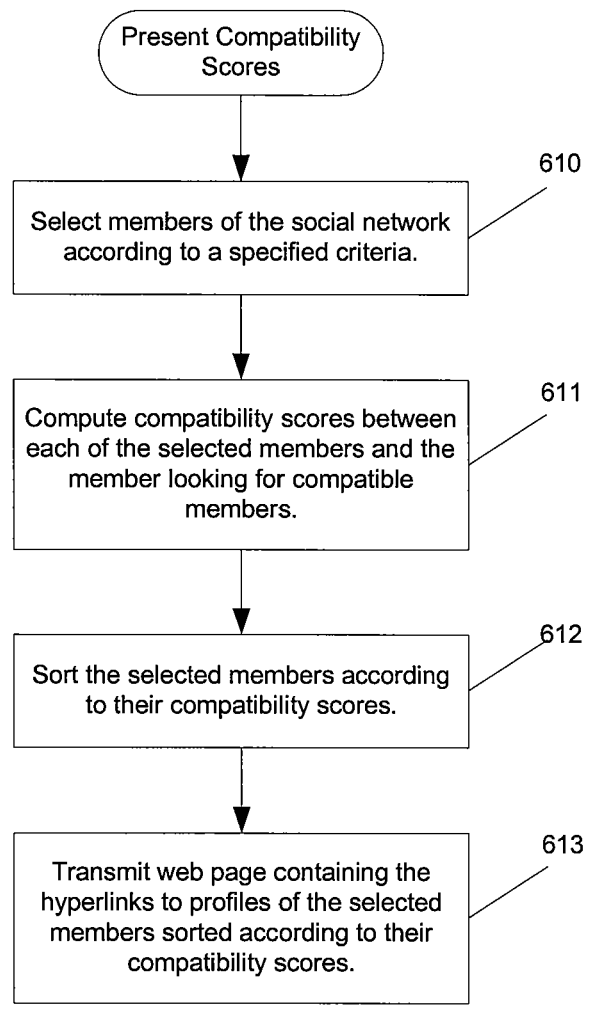
FIG. 6 is a flow diagram illustrating the process steps for generating a member search results page containing compatibility scores.

FIG. 6 is a flow diagram that illustrates the process steps executed by the processor of the application server 251 in presenting compatible scores of those members who meet a set of criteria specified by a member of the social network. In Step 610, the members of the social network who meet the specified criteria are selected. A sample graphical user interface (GUI) for specifying the set of criteria is illustrated in FIG. 7. The GUI 700 shows the criteria that can be specified by the member. They include: age, gender (men, women, men & women), location, purpose of the search, relationship status and keywords in selected categories such as hometown, companies, schools, affiliations, interests, favorite movies, favorite books, favorite music, and favorite TV shows. The GUI 700 also provides a setting for degree of separation (d/s): members who are within 1 d/s, members who are within 2 d/s, members who are within 3 d/s, or all members. After specifying the criteria, the member clicks on the search button 710, in response to which the application server 251 performs the search of the members who meet the specified criteria.

In Step 611, a compatibility score between the member specifying the criteria and each member of the social network who meets the specified search criteria is computed. In Step 612, the members of the social network who meet the specified search criteria are sorted according to their compatibility scores, and in Step 613, a web page containing images, mini-profiles, and hyperlinks associated with the members of the social network who meet the specified search criteria are transmitted to the member for display. The web page transmitted in Step 613 is formatted such that the images, mini-profiles, and hyperlinks associated with the members are displayed according their compatibility scores (highest to lowest). FIG. 8 shows a sample search results page 800.

The compatibility score between two members can be adjusted based on relationship information stored for the two members. In one embodiment, the compatibility score between the two members is increased based on the number of common first through Nth degree friends that the members have. N is typically set to 2 or 3, but may be any positive integer. The compatibility score may be increased in proportion to the number of common first through Nth degree friends that the members have, with the increase based on first degree friends being weighted higher than the increase based on second degree friends, and the increase based on second degree friends being weighted higher than the increase based on third degree friends, and so forth.

Figure 9:
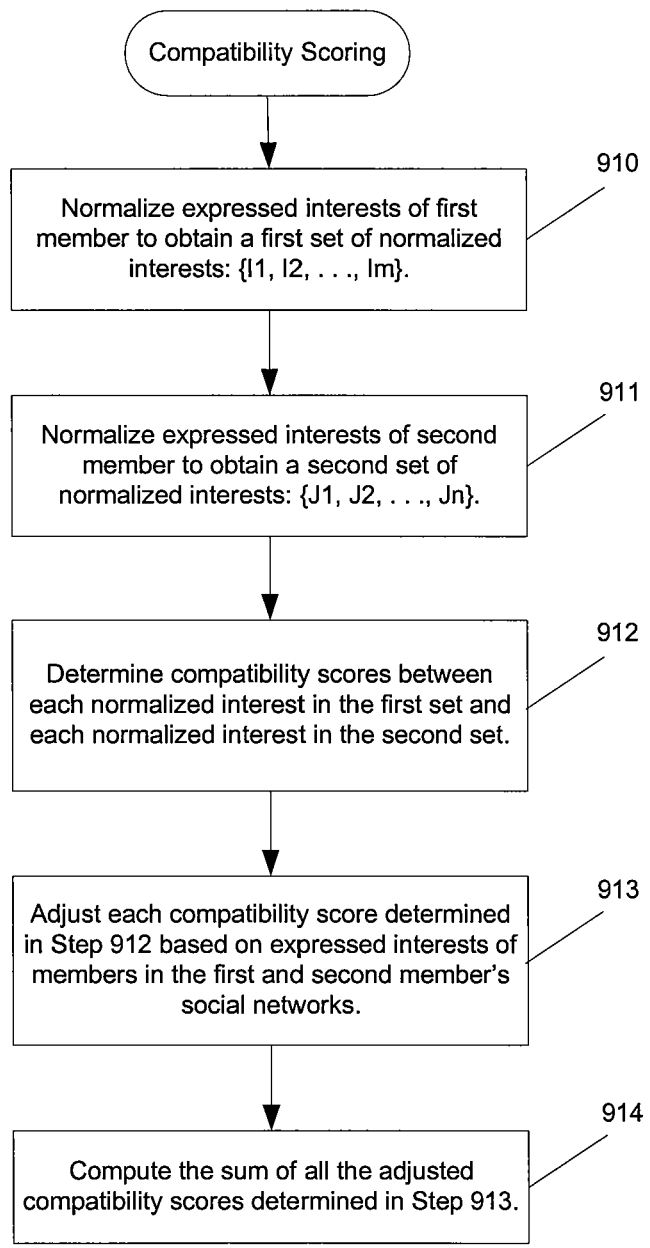
FIG. 9 is a flow diagram illustrating the process steps for computing a compatibility score between two members of a social network according to another embodiment of the present invention.

In another embodiment, the compatibility score between a first member of the social network and a second member of the social network is adjusted based on the commonality of the first member's expressed interest in the first member's social network and the commonality of the second member's expressed interest in the second member's social network. FIG. 9 is a flow diagram that illustrates the process steps executed by the processor of the application server 251 in computing a compatibility score between two members, e.g., a first member and a second member, with the adjustment based on the commonality of the first member's expressed interest in the first member's social network and the commonality of the second member's expressed interest in the second member's social network.

In Step 910, the expressed interests of the first member are normalized into a first set {I1, I2, . . . , Im} of normalized interests, where m represents the number of normalized interests in the first set. In Step 911, the expressed interests of the second member are normalized into a second set {J1, J2, . . . , Jn} of normalized interests, where n represents the number of normalized interests in the second set. In Step 912, the interest compatibility scores for all pairs of normalized interests in the first and second sets are determined from the matrix 320. For example, if the first set is {Interest_1, Interest_2} and the second set is {Interest_2, Interest_3}, the following compatibility scores are retrieved from the matrix 320:

Compatibility(Interest_1, Interest_2);
Compatibility(Interest_1, Interest_3);
Compatibility(Interest_2, Interest_2); and
Compatibility(Interest_2, Interest_3).

In Step 913, each of the compatibility scores determined in Step 912 is adjusted based on the commonality of the first member's expressed interest in the first member's social network and the commonality of the second member's expressed interest in the second member's social network. For example, the adjustments, k12, k13, k22, k23, are made to the compatibility scores determined in Step 912 as follows:

k12*Compatibility(Interest_1, Interest_2);
k13*Compatibility(Interest_1, Interest_3);
k22*Compatibility(Interest_2, Interest_2); and
k23*Compatibility(Interest_2, Interest_3).

The adjustment, kij, is a function of the number of first through Nth degree friends of the first member who have expressed an interest corresponding to Interest_i and the number of first through Nth degree friends of the second member who have expressed an interest corresponding to Interest_j. N is typically set to 3 or 4, but may be any positive integer. The properties of the adjustment, kij, are as follows:

1. kij.gtoreq.1;
2. kij=kji;
3. kij increases in proportion to the number of friends of the first member who have expressed an interest corresponding to Interest_i, with the amount of increase being weighted higher for closer degree friends; and 4. kij increases in proportion to the number of friends of the second member who have expressed an interest corresponding to Interest_j, with the amount of increase being weighted higher for closer degree friends.

In Step 914, the adjusted compatibility scores determined in Step 913 are summed, and the sum represents the compatibility score between the first member and the second member.

While particular embodiments according to the invention have been illustrated and described above, those skilled in the art understand that the invention can take a variety of forms and embodiments within the scope of the appended claims.

What is claimed is:

1. A method comprising, by one or more computing devices:
receiving, from a first user, a request to search for compatible users, wherein the first user is associated with a set of first expressed interests; accessing one or more sets of second expressed interests of one or more second users, respectively;
normalizing the set of first expressed interests and the sets of second expressed interests to obtain a set of first normalized interests and one or more sets of second normalized interests, respectively;
calculating, for each set of second expressed interests, an interest compatibility score based at least in part on a probability that a user will express one or more pairs of a first normalized interest and a second normalized interest; and
transmitting a web page formatted such that information associated with one or more of the second users is displayed according to the calculated interest compatibility scores;
wherein P(I) is a probability that a user will express an interest corresponding to a normalized interest I, and wherein P(I)=(a number of users in the member database who expressed an interest corresponding to the normalized interest I)/(a total number of expressed interests stored in the member database), and
wherein the displayed information comprises, for each second user, one or more of a profile image, a mini-profile, or a hyperlink associated with the second user.

2. The method of claim 1, further comprising:
accessing a member database comprising profile information associated with a plurality of users, wherein the profile information comprises all expressed interests of the plurality of users.

3. The method of claim 1, wherein $P(I_1, I_2)$ is a probability that a user will express a first expressed interest and a second expressed interest corresponding to a pair of a first normalized interest $I_1$ and a second normalized interest $I_2$, respectively, and wherein $P(I_1, I_2)$=(a number of users in the member database who expressed with the first expressed interest and the second expressed interest corresponding to the first normalized interest $I_1$ and the second normalized interest $I_2$, respectively)/(a total number of expressed interests stored in the member database).

4. The method of claim 3, wherein $S(I_1, I_2)$ is an interest compatibility score between a pair of the first normalized interest $I_1$ and the second normalized interest $I_2$, and wherein $S(I_1, I_2)=\log[P(I_1, I_2)/(P(I_1)*P(I_2))]$.

5. The method of claim 1, wherein the set of first expressed interests and the sets of second expressed interests are normalized based on an interest classification process.

6. The method of claim 5, wherein the interest classification process normalizes a particular expressed interest by determining that the particular expressed interest corresponds to an interest classification of a particular normalized interest.

7. The method of claim 6, wherein each interest classification corresponds to a plurality of expressed interests.

8. The method of claim 1, further comprising, for each set of second expressed interests: adjusting the interest compatibility score based on a commonality of the first normalized interests and second normalized interests expressed by a plurality of users associated with the first user.

9. The method of claim 8, wherein the plurality of users are connected to the first user in an online social network.

10. The method of claim 1, further comprising:
accessing a social graph comprising a plurality of nodes and a plurality of edges connecting the nodes, wherein each node corresponds to a user of the online social network, wherein each edge between two nodes represents a single degree of separation between the two nodes, and wherein a degree of separation between any two nodes is a minimum number of edges required to traverse the social graph data from one user node to the other.

11. The method of claim 10, wherein the social graph comprises: a first node corresponding to the first user; and
one or more second nodes correspond to the one or more second users, respectively.

12. The method of claim 11, wherein the degree of separation between each second node and the first node is greater than one.

13. The method of claim 12, wherein the degree of separation between each second node and the first node is less than or equal to a user-specified degree of separation.

14. The method of claim 1, wherein one or more of the first normalized interests and second normalized interests comprise pre-defined interests.

15. The method of claim 1, wherein the request received from the first user is associated with a third-party web site, third-party application, or third-party web service.

16. The method of claim 1, wherein the request received from the first user is a request to search for compatible users of an online social network.

17. A system comprising: one or more processors; and a memory coupled to the processors comprising instructions executable by the processors, the processors operable when executing the instructions to:
receive, from a first user, a request to search for compatible users, wherein the first user is associated with a set of first expressed interests;
access one or more sets of second expressed interests of one or more second users, respectively;
normalize the set of first expressed interests and the sets of second expressed interests to obtain a set of first normalized interests and one or more sets of second normalized interests, respectively;
calculate, for each set of second expressed interests, an interest compatibility score based at least in part on a probability that a user will express one or more pairs of a first normalized interest and a second normalized interest; and
transmitting a web page formatted such that information associated with one or more of the second users is displayed according to the calculated interest compatibility scores;

wherein P(I) is a probability that a user will express an interest corresponding to a normalized interest I, and wherein P(I)=(a number of users in the member database who expressed an interest corresponding to the normalized interest I)/(a total number of expressed interests stored in the member database), and wherein the displayed information comprises, for each second user, one or more of a profile image, a mini-profile, or a hyperlink associated with the second user.

18. One or more computer-readable non-transitory storage media embodying software that is operable when executed to;

receive, from a first user, a request to search for compatible users, wherein the first user is associated with a set of first expressed interests;

access one or more sets of second expressed interests of one or more second users, respectively; normalize the set of first expressed interests and the sets of second expressed interests to obtain a set of first normalized interests and one or more sets of second normalized interests, respectively;

calculate, for each set of second expressed interests, an interest compatibility score based at least in part on a probability that a user will express one or more pairs of a first normalized interest and a second normalized interest; and transmitting a web page formatted such that information associated with one or more of the second users is displayed according to the calculated interest compatibility scores;

wherein P(I) is a probability that a user will express an interest corresponding to a normalized interest I, and wherein P(I)=(a number of users in the member database who expressed an interest corresponding to the normalized interest I)/(a total number of expressed interests stored in the member database), and wherein the displayed information comprises, for each second user, one or more of a profile image, a mini-profile, or a hyperlink associated with the second user.

* * * * *